United States Patent
Hilberg et al.

(10) Patent No.: US 12,548,089 B2
(45) Date of Patent: Feb. 10, 2026

(54) OPTIMIZATION OF HYBRID GROWING INFRASTRUCTURE FOR DIFFERENT WEATHER PROFILES AND MARKET CONDITIONS

(71) Applicant: Local Bounti Operating Company, LLC, Hamilton, MT (US)

(72) Inventors: Gary R. Hilberg, Cypress, TX (US); Thomas C. Tillman, Sugar Land, TX (US); Bryan Nguyen, Garland, TX (US)

(73) Assignee: Local Bounti Operating Company LLC, Hamilton, MT (US)

( * ) Notice: Subject to any disclaimer, the term of this patent is extended or adjusted under 35 U.S.C. 154(b) by 241 days.

(21) Appl. No.: 17/979,302

(22) Filed: Nov. 2, 2022

(65) Prior Publication Data

US 2023/0134154 A1 May 4, 2023

Related U.S. Application Data

(60) Provisional application No. 63/275,126, filed on Nov. 3, 2021.

(51) Int. Cl.
*G06Q 50/02* (2024.01)
*G06Q 30/0201* (2023.01)

(52) U.S. Cl.
CPC ......... *G06Q 50/02* (2013.01); *G06Q 30/0206* (2013.01)

(58) Field of Classification Search
CPC ............................ G06Q 50/02; G06Q 30/0206
USPC ....................................................... 705/7.11
See application file for complete search history.

(56) References Cited

U.S. PATENT DOCUMENTS

| | | | |
|---|---|---|---|
| 2015/0081058 A1* | 3/2015 | Oliver | A63F 9/24 700/91 |
| 2016/0366833 A1* | 12/2016 | Pohjanvouri | G05B 15/02 |
| 2020/0184153 A1* | 6/2020 | Bongartz | A01G 9/24 |
| 2021/0400885 A1* | 12/2021 | Ouammi | A01G 9/241 |
| 2022/0319165 A1* | 10/2022 | Tran | A01G 25/165 |

OTHER PUBLICATIONS

"An investment decision support tool for horticulture with an adaptive energy management system" to Treethidtaphat et al, Jul. 19, 2019 (Year: 2019).*

* cited by examiner

*Primary Examiner* — Po Han Lee
(74) *Attorney, Agent, or Firm* — Maier & Maier, PLLC

(57) ABSTRACT

An embodiment may respond to different weather profiles and market conditions within a controlled environment agricultural system, which may include one or more power consuming and environment controlling systems. Different market demands and prices may be used to influence which plants are grown and when they should be harvested. The growing process may be altered based on market demand, which may call for a varietal to be harvested at a delayed time or may require some other parameters to be optimized. A control unit may identify criticality of and power consumption by the systems and may compare those with the current cost of power. The control unit may analyze the cost of adjusting power to systems and the cost of powering those systems during a specified period of time. A weather profile may be forecasted which can be used to identify which systems to power or when to store energy.

17 Claims, 5 Drawing Sheets

FIG. 1

| Growing Phases | Plant Conditions | Environment |
|---|---|---|
| Germination | Size | Heating |
| Nursery Phase 1 | Weight | Cooling |
| Nursery Phase X | Health | Lighting |
| Greenhouse 1 | Total light | Humidity |
| Greenhouse X | Cycle duration | Nutrients |
| Harvesting/Packaging | Market demand | Water |

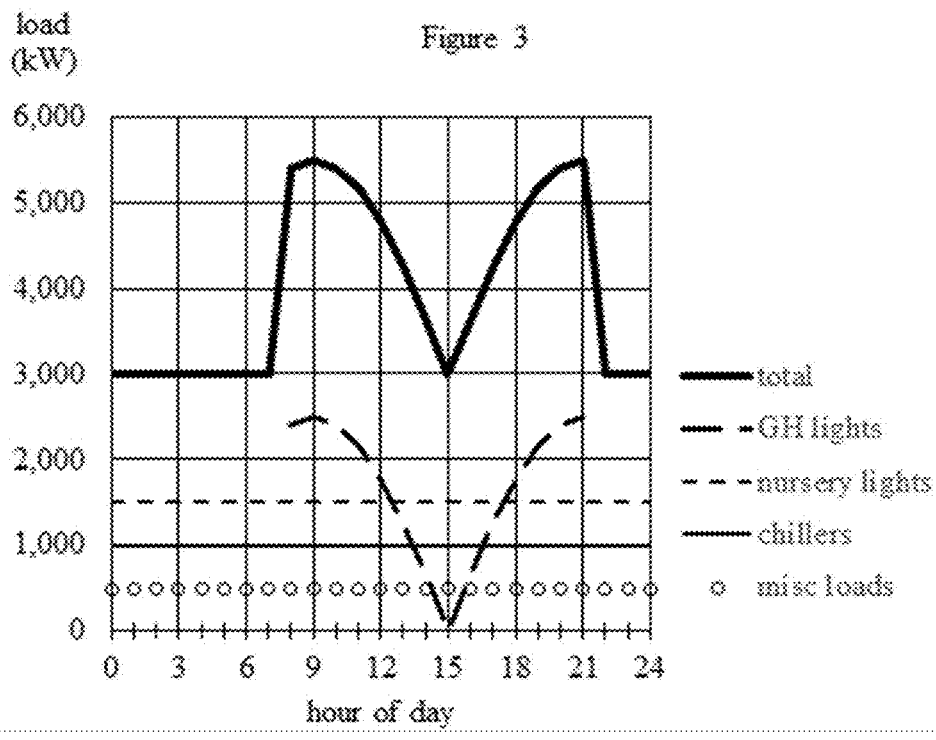
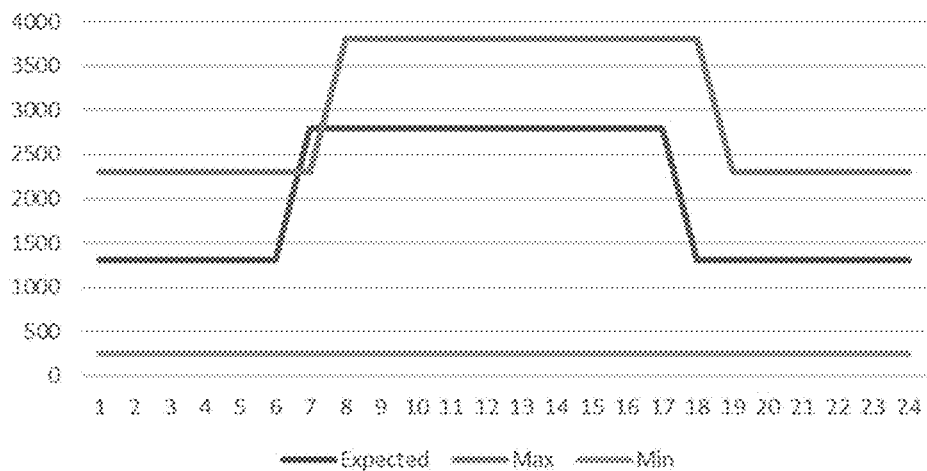

OPTIMIZATION OF HYBRID GROWING INFRASTRUCTURE FOR DIFFERENT WEATHER PROFILES AND MARKET CONDITIONS

FIELD

An exemplary embodiment may relate to the field of controlled environment agriculture.

BACKGROUND

Energy usage and capital costs are major concerns among emerging agricultural methods. For example, one study showed that hydroponic agricultural methods may require as much as 82 times more energy compared to conventional agriculture, when producing leafy greens.

Controlled environment agriculture (CEA) techniques are typically implemented in an indoor environment, such as within a greenhouse, warehouse, or other building. The building may require an air conditioning system for controlling temperature and humidity and may also require multiple artificial light sources. The air conditioning system and light sources may require large amounts of energy and capital investments, especially compared to conventional outdoor farms which receive light from the sun and might not require any air conditioning. Further, CEA may require additional systems such as, for example, pumps for watering the plants equipment for harvesting and packaging product.

The demand for electricity for these uses may vary dramatically both on an hourly, daily and seasonal basis. The CEA facility may have on-site electrical generation from renewable or fossil power generation equipment to contribute to demand/generation model. Most developed countries have extensive electrical systems that must instantaneously balance generation and demand. These electrical systems may offer variable pricing-based usage times and payments for both electricity reductions and increases (energy), with fast response time being valued highly. The ability to offer firm commitments (capacity) to both increase and decrease electricity may also be valued.

SUMMARY

According to at least one exemplary embodiment, a method, system and apparatus for optimizing a hybrid controlled environment agriculture (CEA) may be shown and described. In an exemplary embodiment, the CEA facility may be optimized for different climatic zones with regard to the relative scale of vertical, greenhouse, and other CEA growing conditions. An exemplary embodiment may balance energy inputs (such as electricity and/or natural gas) water usage and land usage with total capital costs, operating costs, and greenhouse gas production. An exemplary CEA facility may account for market locations to address transportation costs and market demands for various agricultural products. A control system or unit may responsively react to the needs of an electrical grid and the varying price for electricity. The control unit may accept both tariff and market-based grid signals and may reduce or increase electrical load accordingly. An embodiment may further process and rank available loads which may be reduced or increased as well as the potential reduction in cost associated with the load reductions or payments associated with absorbing or storing electricity. This ability may be communicated in real-time to the local electric utility or system operator to support their demand planning.

An exemplary control unit may granularly and quickly respond to electrical grid requests for electricity reduction or increase, and may control the associated systems in order to reduce or increase the electrical load. The electrical loads within an exemplary CEA facility may be continuously tracked and monitored. Each electrical load may be associated with a ranking or value indicating the load's criticality to the growing process at the specific time in the growing cycle. Loads may be selectively reduced or increased. For example, if lighting in one section of the CEA facility is found to have a large electrical load and high cost to operate, an exemplary control unit may reduce or deactivate the lighting in that section. It may be contemplated that the lighting may be reactivated or increased at another point in time, for example, when the electrical supply becomes cheaper or when the utility/grid has excess power that may be absorbed or stored.

In some embodiments, the electricity costs (associated with both energy and capacity) may vary throughout the day. For example, energy may refer to the energy available from an electrical grid or a renewable (or non-renewable) resource that may be locally situated. Capacity may refer to the cost or availability of storing energy from the grid or from an energy source. The control unit may thus deactivate some electrical loads at points in the day where electricity costs are high, and then may reactivate those electrical loads at a point where the electricity costs become lower. Other factors may influence the optimization of electricity, such as electricity supply availability, criticality of the system, the stage of growth of the crops, or the value of the crops. The control unit may provide a firm load profile to the electric utility/system operator based on expected needs (capacity demands) with specific opportunities for electricity usage increases or decreases and the time necessary to provide these variations.

An exemplary embodiment may include a thermal energy storage unit, which may allow excess thermal energy to be stored and used later. Thermal energy storage systems may store thermal energy produced during, for example, off-peak hours where the electric cost of producing the heat may be lower or negative. An exemplary embodiment may also include an energy storage system for storing electricity at points where electricity is available or has a lower cost.

An exemplary embodiment may include energy storage using the CEA system's pond water to store heating and cooling energy based on the season and the CEA operating parameters, An exemplary embodiment may include an electricity market feed forward system where the future expected electricity system needs are known, and the CEA system may use more energy to set the environmental conditions with operating boundaries to allow for period of lower electricity usage. This may include energy storage within the operating systems, advanced harvesting & packaging to reduce future demand, storing thermal energy and changing personnel work schedule, among others.

An exemplary embodiment may include a bilateral or multilateral energy storage system that may share a cooperative relationship. Banks of energy storage cells may communicate status and health allowing the management systems to handle each bank appropriately to sustain and optimize the banks based on their chemistry and needs. This may include managing the banks in a way where energy can be diverted appropriately within the infrastructure while also considering the sustainable needs of the cell's chemistry, charging and discharging with respect to current and future expectations, supplying energy singularly, distributively, or collectively. A weather forecasting model that adjusts the energy demands of the plant growing systems due to the availability to light, cooling and heating from the environment and as such modify the expected energy demand profile in the future. This system may also integrate with the energy storage systems to pre-load their capacity to deliver future needs with less/more demand of energy based on production costs/value, energy costs, and demand charge/benefit profiles.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary table illustrating exemplary growing phases alongside potential plant conditions and environmental conditions.

FIG. 3 is an exemplary daily electricity demand curve showing the ability reduce and increase the electrical usage in a CEA facility.

DETAILED DESCRIPTION

Figure 2:
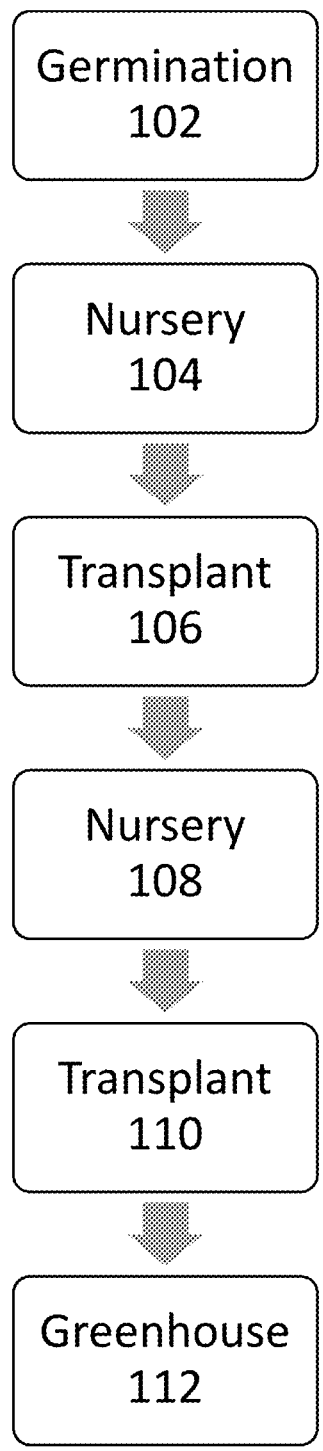
FIG. 2 may illustrate an exemplary plant growing process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may include an optimized hybrid growing infrastructure. The infrastructure may be altered based on weather profiles and market conditions. An embodiment may alter the infrastructure using a control system or control unit. The infrastructure may be altered for the weather profiles or market conditions upon initially building an exemplary embodiment and may be further altered to respond to changing weather forecasts, weather profiles and market conditions. The control unit may be connected to multiple systems within a controlled environment agriculture (CEA) embodiment. Some systems which may be altered include, for example, a plant varietal to be planted, an energy source, a growing process, a watering method, a lighting method, or any other contemplated factor.

For example, an embodiment may identify market information including, but not limited to, market demand and market price for multiple plant types. The market information may also indicate price per pound or per crop. The cost at which each varietal can be produced may also be accounted for and associated with the market information. Then, an exemplary embodiment may identify which varietals to plant based on the market demand and an expected profit calculated from the market information and the production cost. It may be contemplated that an exemplary embodiment may control various control systems to plant and grow the identified varietal. The growing environment may also be altered to accommodate the chosen varietal. For example, an amount of lighting, a type and amount of nutrients, a temperature, an amount of carbon dioxide, and any other variables may be chosen by the control unit and applied.

An exemplary control unit may be connected to multiple sensors or systems to identify energy or electricity usage and electricity cost both for energy and capacity. The electricity usage and cost may be input to the control unit constantly, such that the control unit may continuously control systems based on, for example, electricity costs. An exemplary system may include the ability to receive third party inputs for factors that contribute to retrospective system capacity pricing in some electrical markets. It may include direct connection with electrical utilities, energy marketing firms or system operators which may bid the energy and capacity features into electricity markets. An exemplary electricity market feed forward system may include future electricity pricing information. For example, the electricity market feed forward system may model the future of the electricity market as a pricing model or forward pricing curve. The pricing model may be used by a control system to identify optimal dates and times to store energy. For example, if the pricing model indicates that electricity from the grid or market will be more expensive at a given time, the control system may store energy in advance of the given time in order to reduce the amount of electricity needed during the more expensive period of time.

A weather profile may also be identified by an exemplary embodiment. Weather may be forecasted and accounted for. An exemplary embodiment may include an energy storage system which may be powered or charged via a power source. It may be contemplated that an exemplary embodiment can draw energy from both a renewable energy source and a power grid, depending on the conditions. In an exemplary embodiment, the weather profile may identify that, for example, a period with a low solar intensity is expected in the current area in the future based on past weather patterns in the location, and may therefore store energy from the photovoltaic cells or from the grid in anticipation of that period. Market conditions may also impact the storage of energy and may be used in conjunction with the weather profile. For example, if a period with a high solar intensity is forecasted, an exemplary embodiment may utilize energy already stored in the energy storage unit in anticipation of refilling or recharging the energy storage unit during that period.

Weather profiles and weather forecasts may be used in conjunction with the market conditions. For example, market conditions may identify a demand, expected sales volume, and/or expected sale price of a crop, or the cost of the nutrients required to grow the crop. Market conditions may also include electricity cost, a heating fuel cost, a nutrient cost, an expected sale price of a varietal, and an expected sales volume of a varietal. An exemplary embodiment may calculate the cost to produce the specified crop in terms of the electricity, nutrients, water, and other resources required for the varietal's production. The cost to produce the crop varietal may depend on the weather profile and the weather forecast. For example, the weather profile may indicate a period of cold temperature or a cold season. During the cold season, an exemplary embodiment may require additional electricity due to the lack of natural light or heat, which instead may need to be supplanted with artificial light and additional heating.

An exemplary embodiment may identify an expected variance that may result from altering environmental parameters. The variance may describe losses, such as a loss due to a decreased size, a loss due to increased amount of time required to reach full growth, or any other type of loss that may be measured as a result of the altered environmental parameters. For example, some crops may require different temperatures than others, and an exemplary embodiment may identify an ideal temperature for growing each of the crops as well as an expected variance or growth inhibition that would result from growing the specified crop at a temperature higher or lower than the identified plant-specific ideal temperature. The expected variance can be weighed against the cost to grow the crops at the ideal temperature. For example, an embodiment may also identify an expected decrease in revenue, sales price, or production due to the growth inhibition from the non-ideal temperature. An exemplary embodiment may measure the expected cost to operate the machinery to produce the plants based on the weather profile and/or forecast and may weigh this cost against the potential revenue from production and sales of the crop. Weather profiles may be used to identify potential production and revenue for a period of time in the future.

An exemplary embodiment may identify an ideal crop for planting based on the weather profiles, weather forecast, and market conditions. For example, an exemplary embodiment may identify an area where additional crops may be planted. An embodiment may consider the weather profile of the region in which the crops are to be planted. The weather profile may indicate an expected cost to grow the crops during the specified time period. In addition, a weather forecast may be used to identify which plants could grow in the upcoming time period. For example, the weather forecast may identify an incoming cold front, indicating that additional heating may be needed. An exemplary embodiment may identify a degree or extent to which the additional heating may be needed and may calculate a cost associated with the weather forecast and selected or contemplated crop varietal.

An embodiment may identify a next varietal to plant based on the weather profile, weather forecast, and/or market conditions. Referring to the previous example of a weather forecast indicating a cold front, an exemplary embodiment may select a varietal adapted to colder temperatures in place of one which requires warmer temperatures. Although temperature has been used in the foregoing examples, other contemplated weather conditions may also be used such as, for example, available sunlight or ambient humidity, among other possible conditions or factors. An exemplary embodiment may consider the cost to grow a varietal while considering multiple variables from the weather profile, weather forecast, and market conditions. The next varietal to plant may be identified based on the associated costs, as determined by, for example, the costs of running the systems required to grow the varietal while factoring in additional electricity spent or an amount of electricity savings due to the weather profile and/or weather forecast, as well as expected demand and price as identified from the market conditions. For each contemplated varietal, an exemplary embodiment may compare the costs associated with growing against the market demand and price to identify the next varietal to plant. For example, an embodiment may identify that due to changing weather conditions, a first plant would be more expensive to grow than a second plant due to the additional resources required to counteract the weather. In this exemplary embodiment, the system may autonomously identify that the first plant varietal is more expensive than the second plant varietal and may instead autonomously plant the second plant varietal in the next open area. The decision to plant the second plant varietal instead of the first plant varietal may be based on, for example, a weather profile and/or weather forecast indicating weather more suited to the second varietal, and/or a change in market condition such that the demand for the second varietal is higher.

The heating and cooling of the controlled environment may depend on the varietals. Additionally, a next varietal to plant may be selected based on varietals already growing in a facility. For example, an exemplary embodiment may identify that although a first varietal may be less profitable to grow individually than a second varietal, that due to the presence of the first varietal in the facility it may be more profitable to plant additional crops of the first varietal, which the facility environment may already need to be configured for, instead of the potentially more profitable second varietal which may interfere with the growing environment of the first varietal which is already growing in the facility.

Alternatively, an exemplary embodiment may identify costs associated with altering plant varietal parameters of plants already growing in the CEA. For example, an embodiment may calculate a cost associated with a variation or alteration in the plant varietal parameters in terms of the value lost from the plants and in terms of the cost savings realized by implementing the altered plant parameters.

In addition to identifying costs and savings associated with the weather and market conditions, an exemplary embodiment may also increase or decrease the production speed based on the market and/or weather conditions. For example, if an exemplary embodiment identifies a market condition indicating low market demand for a varietal currently growing in the CEA, the control unit may adjust the plant parameters specific to that varietal in order to slow down growth to match the market demand. A control unit may access a database of plant varietal parameters that could indicate expected grow times and/or sizes associated with various adjustments made to the plant parameters/environment. For example, a historical database may indicate that a lowering or cooling of the temperature of a varietal to a specific degree could slow down production by two weeks. The control unit may opt to lower the temperature to that degree for a period of time when the market demand is low. This ensures that crops are not wasted due to a lack of demand and allows growers to dynamically adjust to live market changes.

It may be contemplated that the market changes could be changes to the plant varietal price, consumer demand, electricity costs, transportation or shipping costs, or any other contemplated change. For example, production may be slowed down upon an indication that the current electricity prices are higher than future electricity prices, and the plant may be cheaper to produce at a slower rate in order to take advantage of future electricity prices and in order to limit current electricity usage. Alternatively, production may be expedited if the market conditions indicate increased electricity prices for a future period. Electricity cost may also be associated with weather conditions.

For example, an exemplary embodiment may identify, from a weather profile and/or weather forecast, that an upcoming period of time has a low solar intensity or low expected wind output. In this example, the CEA facility may include one or more renewable energy resources such as photovoltaic cells or wind generators. The weather profile may indicate a lower power output of the renewable energy sources in a future period and may increase or expedite production of the crops and/or may store additional energy in anticipation of the future weather profile or forecast. Alternatively, a weather profile or forecast indicating an anticipated increase in solar intensity or wind output may cause an exemplary control unit to decrease or slow down current production in order to take advantage of potential energy savings in the future when the solar intensity or wind is expected to increase (thus providing more energy to the renewable resources).

An amount of time spent in each phase may also be adjusted by an exemplary embodiment. For example, it may be contemplated that time spent in a vertical nursery can be increased or decreased to inhibit or advance growth. It may be contemplated that an exemplary control unit can identify a growth rate of a varietal in each of a greenhouse or a nursery. If the growth rate of a varietal is lower in the nursery phase, an exemplary embodiment may transfer or maintain plants in the nursery to inhibit or slow growth. This may be due to the market or other factors which indicate that the varietal may be overproduced or can otherwise be slowed down. An exemplary embodiment may identify an upcoming weather event, such as a storm, and may increase or decrease a time spent in each phase based on the timing of the upcoming weather event. For example, a plant varietal which requires or responds better to natural sunlight may be brought into a greenhouse with natural sunlight, instead of a vertical nursery, in advance of an upcoming storm during which natural sunlight might not be available, the plant varietal may get much natural sunlight beforehand. An embodiment may slow down growth in a nursery if a weather condition indicates that growth in the greenhouse may be slower. In this example, the nursery may be slowed until the greenhouse is sufficiently lit above a certain solar intensity threshold, at which point the nursery may be returned to normal operating parameters and/or plants may be transferred to the greenhouse. Alternatively, it may be contemplated that an exemplary embodiment identifies an upcoming period of high solar intensity and instead inhibits growth before that period in order to take advantage of the natural sunlight during the period. Furthermore, according to some embodiments, additional artificial lighting may be utilized to augment natural lighting during low light weather conditions.

According to still further embodiments, market conditions and weather profiles may be used to adjust growth parameters to increase or decrease growth speed and/or to adjust density and thereby production quantity in other manners. For example, a forecast showing an upcoming severe weather event or other market condition may trigger increased production in the days or weeks leading up to the event when consumers may be stocking up on supplies and may decrease production or extend growing times when the event, such as a storm, may prevent distribution of products. Events could include weather events, natural disasters, fuel shortages, supply chain issues, or other market conditions, as would be understood by a person having ordinary skill in the art.

An exemplary embodiment may implement the weather and market profiles for any contemplated process and is not limited to energy storage. For example, if a period with a high solar intensity is forecasted, an exemplary embodiment may move additional plants to a greenhouse where they may take advantage of the additional sunlight. HVAC systems may also be controlled in anticipation of the weather profile. For example, colder regions may require additional heating. The weather profile may indicate that a cold front is approaching and may store thermal energy in anticipation of that forecast. Thus, any of the described systems may be altered or modified based on the ambient, market, or capital inputs.

The power source may be, for example, a photovoltaic system (i.e., solar cells) or any other renewable power source. Additionally, the energy storage system may be also connected to a local power grid. For example, if market conditions indicate that power from the grid is in low demand, an exemplary embodiment may store energy from the grid as opposed to from the renewable power source.

Growing conditions and growing duration may be changed based on target dependent variables in the growing process. The independent variables may be adjusted based on progress and the targeted durations. The targeted duration may be dynamically adjusted based on a real-time growing stage of the plants. Variables may be adjusted based on a prediction of the difference in the variables in future environments for the plants. For example, it may be contemplated that some days, months, or seasons may provide more natural light from the sun. Thus, during the time periods where more natural light can be obtained from the sun, variables such as the artificial lighting level may be adjusted to compensate for the extra sunlight available. For example, the artificial lighting level may be reduced in order to reduce electricity usage in anticipation of an abundance of natural light at a future time.

The value of activating or deactivating various systems may differ according to market conditions and weather profiles. For example, an embodiment may identify that an HVAC system may be powered down in a portion of the CEA, and that the subsequent change in temperature might not detriment the plants. This may be due to, for example, a lower market demand allowing for a later harvest, or a change in the weather profile. In this example, the control unit may measure the potential cost of powering the HVAC system for a period of time, and may compare that cost to the potential cost of powering off the system for the same period of time. The cost of powering off the system may be measured by, for example, identifying how the temperature may change in accordance with the powering off of the HVAC system, and identifying how the crop or crops in the area may react to the subsequent temperature change. For example, the control unit might determine that crops in a sector or building can be cooled or heated, and that the heating or cooling might delay the growth of the crops by some period of time. The control unit may determine a value associated with delaying the growth of the crops, such as an opportunity cost which is lost when the crops take longer to grow. Further, a thermal storage system may store energy, such as thermal energy or heat, for use at a later time. In an exemplary embodiment, heat may be stored into the thermal storage system when the cost of producing heat is low, or when excess heat is produced. Thus, a cost may be associated with the delay and then compared with the cost of powering the HVAC system. It may be contemplated that the system identifies a period of time where, for example, the cost of lighting is high, and/or that the deactivation of lighting or shifting the lighting to a different time may have little to no measurable impact on the product quality or growing cycle.

The HVAC system described in the previous example was used merely for illustrative purposes, and it may be contemplated that any system may be powered off (or reduced), such as a lighting system or water pump, and the control unit may weigh the possible effect of powering off the system. It may be contemplated that the control unit may also receive information regarding the crop varietal or cultivar. For example, an exemplary embodiment may include a database of indexed crop varietals, wherein the database may identify the potential growth of each plant as a function of, for example, the amount of light received, the temperature, or the amount of water/nutrients. Thus, an exemplary embodiment might determine that a specific crop can be kept colder without sacrificing grow time or quality, and then may power off a heating system accordingly.

Further, it may be contemplated that an exemplary system may selectively control individual systems within a larger CEA environment. For example, a cooling system may be powered off in one section of a hydroponic agriculture building, while another portion of the same building is still continuously cooled to a different temperature.

In an exemplary embodiment, a control system or unit may responsively react to the needs of an electrical grid. The control unit may accept both tariff and market-based grid signals and may reduce or increase electrical load accordingly; or, alternatively, may increase electricity usage in advance of a planned or market anticipated electricity event based on internal, utility or third party analysis of current and future market conditions. An embodiment may further process and rank available loads which may be reduced as well as the potential reduction in cost associated with the load reductions. These ranking may be determined by user analysis, machine learning or artificial intelligence systems.

An exemplary control unit may granularly and quickly respond to electrical grid requests for electricity reduction/increase and may control the associated systems in order to reduce/increase the load. The electrical loads within an exemplary CEA may be continuously tracked and monitored. Each electrical load may be associated with a ranking or value indicating the load's criticality to the growing process and/or the value to the electrical system. Loads may be selectively reduced/increased at a specified rate.

Criticality may be based on plant metrics and the value of the plants. The plant metrics may be, for example, a response to varying temperature, or a required light consumption. For example, a plant may be amenable to lower temperatures than is ideal. The control unit may identify the effects of a lower temperature on the plant. In this example, the control unit may determine that the effects of the lowered temperature are additional growing time required and a reduced size. The effects of the lower temperature may be assigned a value. For example, the value of the effects may be based on an opportunity cost of the additional growing time required, or may be based on the reduced value of the harvested plants if they are harvested at a reduced size. The control unit can also identify the potential energy and electricity cost savings associated with allowing the plant to reach the lower temperature. The cost savings may be based on, for example, the power consumed by the heating system to heat the plant to the ideal temperature. If the criticality value (in this exemplary case, the cost/value of lowering the temperature measured by the cost of additional growing time and the cost of reduced plant size) is less than the cost savings (in this case, the amount and cost of electricity saved by not powering the heaters to heat the plant to the ideal temperature), the control unit may decide to leave the plants at the lower temperature. In another example, if lighting in one section of the CEA is found to have a large electrical load and high cost to operate, an exemplary control unit may reduce or deactivate the lighting in that section if the criticality of the light system to the associated plants is lower than the cost of the lighting, i.e., the cost of the effect of reduced lighting on the plants for that period of time is lower than the cost of powering the lighting system for the same period of time. It may be contemplated that the lighting may be reactivated or increased at another point in time, for example, when the cost of the electrical supply decreases.

In some embodiments, the electricity costs may vary throughout the day. The control unit may thus deactivate some electrical loads at points in the day where electricity costs are high, and then may reactivate those electrical loads at a point where the electricity costs become lower. Other factors may influence the optimization of electricity, such as electricity supply availability, criticality of the system, the stage of growth of the crops, or the value of the crops. An exemplary embodiment may implement dynamic monitoring of plant parameters to provide the input on specific growing areas available for optimization based on plant quality measurements.

An exemplary embodiment may include a thermal energy storage unit, which may allow excess thermal energy to be stored and used later. Thermal energy storage systems may store thermal energy produced during, for example, off-peak hours where the electric cost of producing the heat may be lower, or in advance of an expected electricity shortage or high pricing period. An exemplary embodiment may also include an energy storage system for storing electricity at points where electricity is available or has a lower cost. Energy storage at a CEA site may include changing control parameters (air and water temperature, humidity, and cumulative lighting) in advance of and during electricity demand events or pre-scheduling to meet planning electricity demand increase/reduction events.

The storage unit may be, for example, a water system. In an exemplary embodiment, the on-site agricultural water system used to water plants may be used to store thermal energy. For example, water within the water system may be heated and/or cooled based on thermal storage needs. Energy may be stored according to, for example, operating parameters required from the energy storage system or closed environment agricultural system. Operating parameters include the energy required to power the energy storage system or agricultural system. For example, the agricultural system may require energy to power a watering system, transport/harvest plants, provide lighting, and for heating and cooling plants as they grow. Further, it may be contemplated that energy may be stored according to the outside weather or the current season. A weather forecasting model may be implemented to identify future weather, which may be used for calculating or deciding when to store energy.

An exemplary embodiment may include a tank for storing energy, which may be charged and discharged as needed. In an exemplary embodiment, thermal energy may be stored in water within the tank. For example, the water may be heated or cooled and stored in the tank. Heated water can be retrieved from the tank and used within an agricultural system. The tank may be integrated with the water system of the agricultural environment. It may be contemplated that the thermal energy may be stored in the hydroponic water systems of an exemplary agricultural environment. Excess thermal energy from one portion of an exemplary hydroponic water system may be directed to another portion.

An exemplary embodiment may include a power supply. The power supply may supply power to the agricultural system. The power supply may be connected to a renewable energy source. In an exemplary embodiment, the power supply may be a solar panel arrangement, although any renewable or non-renewable source may be implemented, and multiple energy sources may be combined. It may be contemplated that an embodiment may also or alternatively be connected to an electrical grid. The control unit may identify the cost of powering the various systems based on the availability of energy from the renewable source or based on the cost of electricity from the grid. An exemplary embodiment may further identify optimal times to switch from renewable energy to grid energy, for example, based on the above factors. Further, the power supply may be operably connected to one or more energy storage systems. In some embodiments, the power supply may redirect and use the electrical grid or renewable energy sources to store energy in the energy storage system. The control unit may determine ideal periods of time for storing energy and for using stored energy based on, for example, future electricity prices, electricity demand, peak electricity usage, and other parameters.

In an exemplary embodiment, the control unit may be implemented on a computer processor, field programmable gate array (FPGA), adaptive compute acceleration platform (ACAP), application-specific integrated circuit (ASIC), or the like. For example, the processor may be within a cloud computing environment, and may be located remotely from the system which is controlled. The control unit may implement machine learning and/or an artificial intelligence algorithm. An exemplary control unit may be embodied on machine readable instructions configured to execute the optimization process, which may be connected to the various systems, power supplies, and/or sensors. For example, in addition to the various plant and environmental parameters measured, an exemplary embodiment may also measure electricity usage.

Referring now to FIG. 1, FIG. 1 may illustrate an exemplary schematic illustrating various growing phases, plant conditions, and environmental conditions that may be monitored, manipulated, or optimized. The plant conditions and environment may be monitored or manipulated in any of the growing phases. The phases may include a germination phase, one or more nursery phases, one or more greenhouse phases, and a final harvesting/packaging phase. Some potential plant conditions or dependent variables which can be monitored may include, but are not limited to, size, weight, health, total light received, cycle duration, and market demand of the plant. Environmental factors or independent variables which can be altered or adjusted by the control unit may include, for example, heating, cooling, lighting, humidity, nutrients, and water. In an exemplary embodiment an HVAC system may control multiple growing environments separately and differently based on the plants growing in each growing environment.

A water storage tank may also be used as a thermal energy storage tank in an exemplary embodiment. Chilled water from the storage tank may be obtained by cooling the water throughout the system, for example, through the building cooling coils or through a chiller/heat pump. The chiller/heat pump may include a compressor and condenser to cool the air. The building cooling coils may alternatively heat the water before returning heated water to a storage tank. The storage tanks can be used to store cold or hot water, depending on operating requirements, market needs/models, an outside temperature or weather forecast, a season, or any other contemplated factor.

Independent variables may be adjusted based on a measurement of the dependent variables. For example, an exemplary embodiment may identify a plant with a plant diameter that is below an optimal level, and may thus determine that the identified plant requires additional nutrients, water, and/or light based on the measurement and the plant type. Historical plant records and data may be recorded and referenced to identify optimal dependent variables for each plant at each stage of growth. Each stage may refer to a growing environment, a time spent in a growing environment, or a time spent since germination, for example.

A hybrid growing environment may include multiple phases or stages, such as planting seeds or seedlings, and growing the seeds or seedlings into plants in a germination phase; transporting the plants to a nursery in one or more nursery phases. The plants may be arranged vertically and receive light from artificial light sources in each nursery phase. The method may continue with transplanting the plants to a greenhouse, where the plants in the greenhouse may be horizontally arranged in a greenhouse phase, and where, during the greenhouse phase, the plants receive sunlight; and harvesting the plants from the greenhouse; adjusting, by a control unit, a plurality of plant parameters; where the step of adjusting the plant parameters occurs during one or more of the germination phase, the one or more nursery phases and the greenhouse phase, and where the control unit is configured to adjust the plant parameters differently according to requirements of each of the germination phase, nursery phase(s), and greenhouse phase. An intensity or a magnitude of the independent variables may be altered according to growth progress or real-time measured dependent variables. Independent variables may be altered in order to obtain a desired growth time or in order to alter the date at which the plants may be harvested. A market demand may be considered in altering independent variables. For example, if market demand for a plant is low or decreases, an exemplary embodiment may alter independent variables to slow down the growing process of that plant. A type of plant or a portion of the total amount of the plant in question, may be slowed such that they may be harvested at a later time. If the market demand for that plant is low, plants can spend additional time growing instead of being harvested. As a result, plants may be harvested at a time FIG. 2 may illustrate an exemplary plant growing process. In an exemplary embodiment, the plant growing process may be split into multiple phases. Each phase may occur in a different location. For example, a first phase may be the germination phase 102. The next phase 104 may be a nursery phase. Then, the plants may be moved or transplanted 106 to subsequent one or more nurseries 108. The transplant 106 may be implemented using robotics. In an alternative exemplary embodiment, the plants may be kept in a first nursery, which may then be transformed in order to change the nursery conditions, thus minimizing movement of plants. The orientation and environment of the first nursery could be altered, including spacing, which may reduce or eliminate the need for transplanting.

The various phases of the cycle may be customized for different varietals and may be adjusted over time. The phases may be customized for optimal time on a final hydroponic system or phase, which may be a natural or artificial system and may include a greenhouse, a deep-water agriculture location, a body of water or any combination thereof. The number of phases, including nursery phases and the specific indexing may all be adjusted as necessary to optimize the process. Different varietals may use any number of nurseries and associated nursery phases. Plants may be supported throughout the phases on platforms that may have at least one plant site. The platforms may be trays or hydroponic plant vessels, which may removably secure to a hydroponic system structure, rest on a hydroponic system structure, float on a hydroponic system, or otherwise support a plant to facilitate hydroponic growing as would be understood by a person having ordinary skill in the art.

A first exemplary phase may be the germination phase 102. In this phase, the crop is initially planted and sprouts from the seed. Germination may take place in a dedicated location or machine. For example, a specific germination chamber may be used in order to house some number of plants or a dedicated germination room used in order to house some number of plants may be implemented; in various exemplary embodiments, such chamber and/or room may be configured to modulate its internal environment based on one or more environmental factors including, for example, the air temperature, relative humidity, light, light intensity, $CO_2$ content, air velocity, and/or air circulation needs of the plants during a given phase. By individually modulating environmental factors in each germination location or machine, the speed of germination may be increased. In an exemplary embodiment, germination may only consist of 0-30 days. Multiple cycles of germination may populate the nursery phase or phases.

Another exemplary phase may be a nursery phase 104. In this phase 104, the plants may begin growing. Formulas may be implemented in order to optimize environmental factors to grow the plants more efficiently. For example, a formula may optimize plant density per square foot, nutrient type and volume, and reduce photon waste from seed to harvest. The minimum footprint and energy usage may be obtained while maximizing yield. The plants may be indexed so as to ensure maximum light absorption while minimizing light wasted on non-foliage space, or white space. The use of such formulas may provide an increase in production by three times in an exemplary embodiment. In the nursery phase plants may be disposed on a nursery tray with optimal plant spacing and density.

Plants may continue to grow in the nursery 104 until they reach a desired size. It may be contemplated that the desired size may be chosen based on the space available, such that plants grow in a nursery until further growth is inhibited by plant density.

At a desired point in the lifecycle, the plants may be transferred to one or more subsequent nurseries for subsequent nursery phases 108 or may be transferred to a greenhouse. In an exemplary subsequent nursery phase, the plants may be larger. Environmental conditions may be changed as plants grow or when plants are moved to subsequent phases or nurseries. For example, an increased photo-period may be implemented, where a higher intensity light is used for a longer period of time. Air flow may be increased to accommodate elevated levels of transportation. Increased levels of nutrients may be implemented to accommodate the increased age of the plant. In an exemplary embodiment, plants may be spread further apart in order to accommodate their increased size.

As plants grow or during a transplant 106 to a subsequent phase or nursery, the number of plants transferred may optionally be reduced. The reduction may be plant specific for optimization. As a result, the plants may be less densely configured so as to allow them room to grow. The step of reducing plant numbers may allow plants to be grown densely early in the lifecycle and spread out later in subsequent phases or nurseries, thus allowing for a larger amount of plants to be grown. According to an exemplary embodiment, all plants being indexed may be moved from a germination phase to a nursery, a nursery to a subsequent nursery, a nursery to a greenhouse, or a subsequent nursery to a greenhouse and the transplanting machine may take a seedling tray, an initial density, and automatically transfer some or all of the plants to one or more new trays with adjusted spacing for optimized density at the next phase. According to some exemplary embodiments, time in various phases may be an input in an optimization formula. For example, the time and indexing in the nursery phases may optionally be adjusted to achieve a desired time in a greenhouse phase. An exemplary greenhouse phase may have a desired length in days, which may be used to optimize the nursery phases. In the nursery phases, indexing, time, and environmental conditions may be optimized to minimize the length of time in the greenhouse. As would be understood by a person having ordinary skill in the art, this may be an exemplary embodiment and may be unique for each varietal.

Each plant may be individually indexed and may have its own indexing formula in each nursery. The index of plants may include information relating to various optimal parameters, such as plant density in trays, individual plant size/mass, plant root size/mass, nutrient or water intake, light intake, a time spent in any of the phases, and the like. For example, plant A may germinate and grow quickly as compared to other plants. Plant A may allow for a higher density but fewer days in a nursery. The density may be decreased in a subsequent nursery and may be further decreased in the greenhouse. The days in the subsequent nursery and/or the greenhouse may also be lower. On the other hand, plant B may require less density in each phase and more days in the nurseries and greenhouse. Each plant varietal may have an individualized formula to optimize efficiency.

In certain embodiments, some or all of the plants from a nursery may be transplanted 106 to one or more subsequent nurseries. In alternative embodiments, the size of the nurseries may vary to accommodate the change in density and duration. According to an exemplary embodiment, the plants may be disposed on a nursery specific tray, which may optimize the spacing for the phase and/or specific nursery conditions, as would be understood by a person having ordinary skill in the art. The tray may be specific to a particular plant species. Nurseries may refer to different physical locations of the plant cycle; however, it may be understood that a nursery may include one or more physical nursery spaces. Nurseries may be different physical sizes or a different number of physical nurseries to accommodate optimal plant density and duration. The duration may be the residence time, or amount of time a plant may spend in each of the nurseries. Furthermore, the trays of a subsequent nursery may be different from an initial nursery to achieve the desired optimization.

Still referring to FIG. 2, the plants may be transplanted 106 from a nursery to one or more subsequent nurseries for a second nursery phase 108. As previously discussed, after requisite time the nursery, the plants may be transferred to the one or more subsequent nurseries. It may be contemplated that different varietals of plants in a nursery may remain in the nursery for different periods of time. In an exemplary embodiment, plants may remain in the same substrate for the entirety of their life. The seeds may be initially planted into soil or a substrate. After a nursery phase, plants may be mechanically transplanted from their cell trays into lower density trays, depending on the type or varietal. The transplanter may grip the substrate using robotic members in order to move. In an alternative embodiment, the plants may be each individually placed in pods which may be gripped and moved by the transplanter. Upon completion of subsequent nursery phases, plants may be mechanically transplanted from the tray configuration to a hydroponic plant vessel, in an exemplary embodiment. The hydroponic plant vessel may be a part of a greenhouse hydroponic system. Hydroponic plant vessels may have a desired number of cells for optimal plant density and may be specific to varietals.

The plants may then continue growing in the one or more subsequent nurseries, which may optionally be less dense and may allow the plants additional space for further growth.

In an exemplary embodiment, another transplant 110 may occur to move the plants from a nursery or subsequent nursery to the greenhouse phase 112. The transplant 110 may also be implemented via robotics. In an exemplary greenhouse phase, plants may no longer be vertically arranged and instead may be laid out or arranged in order to capture natural sunlight. The natural sunlight may increase the speed at which the plants reach their final form, and supplemental lighting might not be needed or may be reduced. Further, while an exemplary nursery may implement an ebb flow or flood drain hydroponic system, an exemplary greenhouse may implement a deep-water culture hydroponic system. In an exemplary embodiment, passive cooling (potentially evaporative in nature) may be implemented in the greenhouse, as opposed to the mechanical cooling & heating systems used in nurseries. It may be contemplated that mechanical cooling & heating or other systems are used throughout, depending on the climate and the application. Other systems may be contemplated. For example, a passive cooling system may be used. Nutritional and environmental conditions may also be altered in the greenhouse or nursery. Nutrients may be added throughout the phases. In an exemplary embodiment, the supply of nutrients may be controlled by an automated control system. Plants may then be harvested from the greenhouse.

FIG. 3 may illustrate an exemplary daily electricity demand curve showing the ability reduce and increase the electrical usage in a CEA facility. The ability to take excess power when available on a time-of-day basis and the ability to respond to power curtailments when necessary. As shown in FIG. 3, an exemplary agricultural environment may include multiple power-consuming systems. For example, FIG. 3 illustrates the power draw of lights in the greenhouse, lights in the nursery, chillers, heat pumps, and other miscellaneous loads. The combination of these systems is also illustrated, thus showing the peak power usage. The peak power usage may be used or optimized by the control unit. For example, the control unit may limit energy usage to stay below a certain threshold. Alternatively, the control unit may switch the power supply to receive energy from the energy storage system for a period of time or during a peak usage period in order to reduce the total peak usage received from the grid. By reducing the peak usage received from the grid, electricity costs may be reduced. In another exemplary embodiment, electric heating may be implemented to allow for usage of excess renewable electricity and energy storage in hydroponic systems.

An exemplary embodiment may include a weather forecasting model that adjusts the energy demands of the plant growing systems due to the availability to light, cooling and heating from the environment and as such modify the expected energy demand profile in the future. This system may also integrate with the energy storage systems to pre-load their capacity to deliver future needs with less/more demand of energy based on production costs/value, energy costs, and demand charge/benefit profiles.

Figure 4:
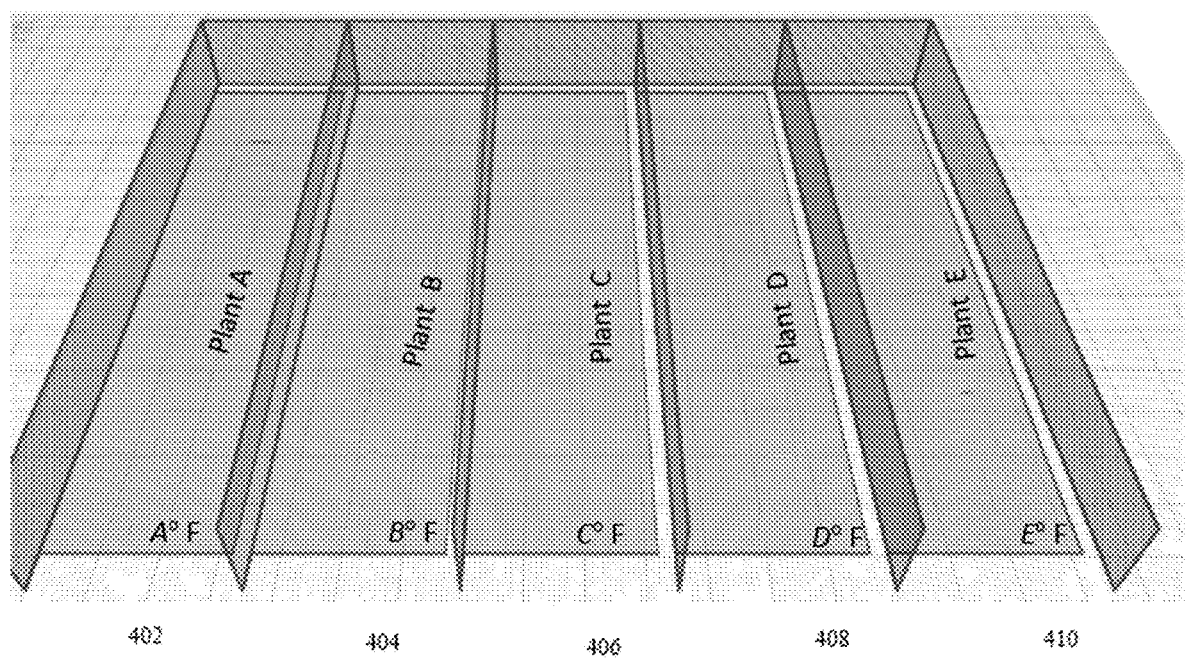
FIG. 4 is an exemplary division of plant products within an exemplary facility.

Referring now to FIG. 4, FIG. 4 may illustrate an exemplary division of plant products. The example in FIG. 4 shows 5 different plants in a facility which are separated from one another. In this exemplary embodiment, Plant C 406 is kept at a different temperature from the neighboring Plant D 408. Similarly, the remaining plants 402, 404, and 410 are also kept at different temperatures. Although not explicitly illustrated, it may be contemplated that any environmental parameter, such as those described above, may be altered individually in each section. For example, it may be desirable for Plant C 406 to be grown at a higher humidity than Plant E 410. Each of the greenhouse zones may be monitored by their own individual sensors. Environmental parameters may be autonomously controlled by their own individual controllers which may drive various systems. In an exemplary embodiment, the AI may monitor the greenhouse zone and autonomously control the environmental parameters. In one embodiment, the controllers may be, for example, programmable logic controllers. Environmental parameters may differ between plants. For example, still referring to the exemplary embodiment in FIG. 4, Plant A 402 may be of a different species than Plant B 404, and therefore may require different environmental parameters, such as a different temperature and/or different nutrients. An exemplary AI system may identify the type of plant and then customize or adjust the parameters based on the plant type, as well as other information such as historical plant data.

The partitions may be chosen according to a weather profile and the market conditions. For example, an embodiment implemented in an area with a low amount of sunlight or lower solar intensity may utilize additional nurseries in order to optimize the amount of time plants stay in the greenhouse. Further, the greenhouses may in those areas with low solar intensity may be supplemented with additional artificial lighting, in addition to the natural sunlight.

Further, the partitioning prevents the spread of pests, virus or disease throughout the entire facility. Instead, a breakout in one section may be contained. Additionally, the partitioned design may allow for a modular expansion of the facility. Additional sections can be easily integrated and expanded. The segmented nature of the facilities may allow maximum flexibility to switch between various crops. The greenhouse and nursery combination may allow for the facility to achieve an optimal combination of natural and artificial light. An AI system may identify a type of each crop and then may individually optimize the crops based on the type.

The partitioning may allow an exemplary embodiment to optimize individual crops which may be planted next to or near plants of other types. Alternatively, implementing a different environment for the same plant varietal across different partitions may allow an exemplary embodiment to experiment by differing independent variables in order to identify where and how to optimize the dependent variables or plant biometrics. It may be contemplated that an exemplary embodiment may slow growth in one or more partitions based on, for example, a reduced demand for that varietal, while still growing other partitions of that varietal at a faster or more efficient speed in order to still meet market expectations.

Figure 5:
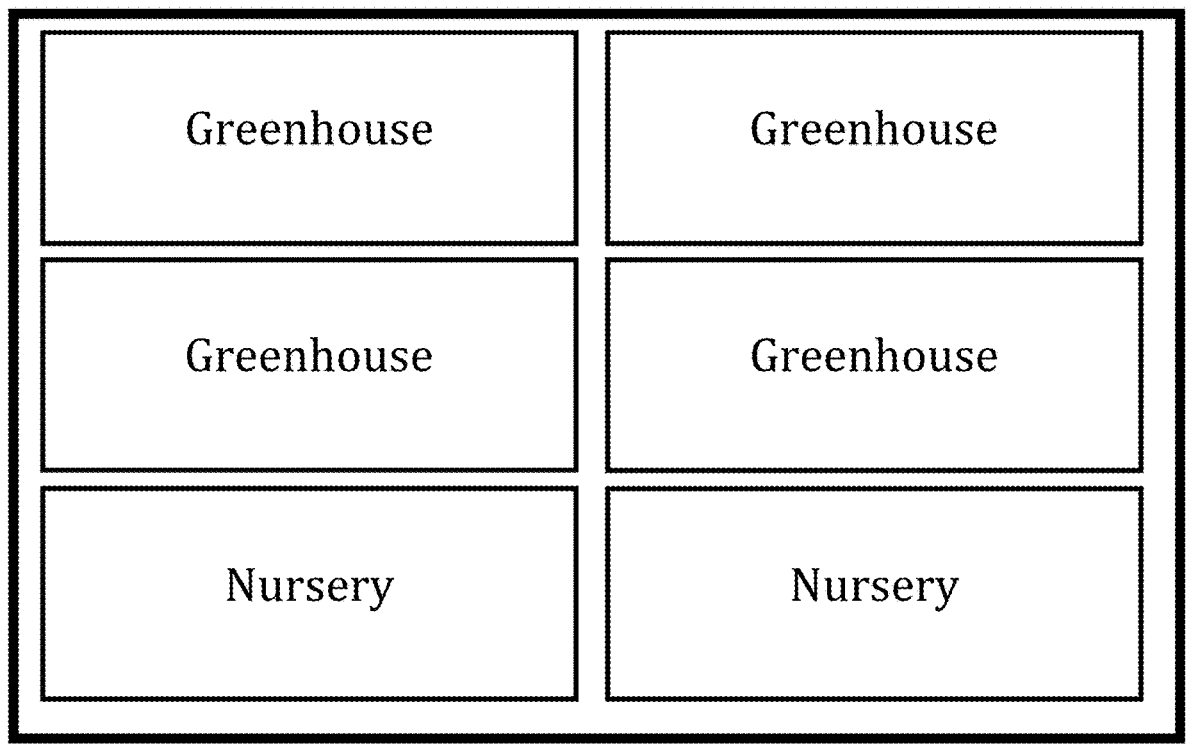
FIG. 5 may illustrate an exemplary layout of a CEA facility with multiple greenhouses and nurseries.

Referring now to the exemplary embodiment in FIG. 5, FIG. 5 may show an exemplary layout of a facility. Multiple greenhouses and nurseries may be partitioned in a facility. Such partitioning allows for multiple different crops to grow in individualized environments. The side panels and medians may be weatherproof and waterproof. An environment in one partition may therefore be kept distinct from the environment in a neighboring partition. The use of multiple partitions may allow for different environments for different plant varietals, or may be used to modify the environment of one plant varietal. For example, it may be desired to slow down growth of half of a plant varietal due to market conditions or a lowered market demand. Thus, an exemplary embodiment may modify or manipulate the environment of some, but not all, partitions which hold that plant varietal. Additionally, multiple partitions for the same plant varietal may allow for experimentation to identify optimal growing conditions. For example, variables may be modified in one partition while kept controlled in another partition of the same varietal. The modified variables may indicate a different outcome for those plants, which may be recorded and stored in a plant growth historical database.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for optimizing a growing infrastructure, implemented in a controlled environment agriculture system, the method comprising:
creating a weather profile for a location of the growing infrastructure, wherein the weather profile indicates an expected weather outlook based on historical weather information and geographical information;
receiving a weather forecast, wherein the weather forecast indicates at least one upcoming future weather event occurring at the location;
receiving a plurality of market conditions, the plurality of market conditions comprising one or more of an electricity cost, a heating fuel cost, a nutrient cost, an expected sale price of a varietal, and an expected sales volume of a varietal;
identifying a value associated with growing each varietal from a plurality of varietals based on the weather profile, the weather forecast, the plurality of market conditions, and a set of plant varietal parameters, the set of plant varietal parameters comprising one or more of a temperature, an amount of sunlight, and an amount of nutrients;
identifying an expected variance in plant size or production due to a variation in the set of plant varietal parameters, wherein the expected variance is identified from a historical database of plant growth according to a plurality of differing plant varietal parameters;
calculating a loss value associated with the expected variance in plant size;
adjusting multiple growing environments, by a control computer, separately and differently based on each varietal from the plurality of varietals growing in each growing environment, the value associated with growing each varietal, the expected variance, the loss value, the weather profile, the weather forecast, and the plurality of market conditions;
moving the respective plants, by a robotic transplanter, to the multiple growing environments adjusted by the control computer; and
moving one or more plants, by the robotic transplanter, from a vertical growing arrangement with artificial lights to a horizontal growing environment with natural light based on the weather profile and/or the weather forecast.

2. The method of claim 1, further comprising:
selecting at least one varietal to plant in the growing infrastructure based on a comparison of the value associated with growing each varietal from the plurality of varietals; and
selecting one or more varietals with a largest value for planting in the location.

3. The method of claim 1, wherein the growing infrastructure comprises a vertical growing environment.

4. The method of claim 1, wherein the plurality of market conditions further comprises a future or predicted energy cost.

5. The method of claim 1, further comprising:
identifying an upcoming weather change from the weather profile and/or the weather forecast, wherein the at least one varietal selected from the plurality of varietals is/are adapted for the upcoming weather change.

6. The method of claim 1, further comprising:
storing electricity after a predicted future electricity cost is greater than a current electricity cost.

7. The method of claim 1, further comprising:
storing electricity after the weather profile and/or the weather forecast indicates an upcoming period of low solar intensity.

8. The method of claim 1, further comprising:
storing thermal energy after the weather profile and/or the weather forecast indicates an upcoming period of low temperatures.

9. The method of claim 8, further comprising:
storing the thermal energy in a water storage tank.

10. The method of claim 1, wherein the variation in the set of plant varietal parameters comprises a variation in light received due to a change from the vertical growing arrangement with artificial light to the horizontal growing environment with natural light.

11. The method of claim 1, further comprising:
- calculating a predicted energy cost savings expected from producing the selected varietal according to the variation in the set of plant varietal parameters;
- after the predicted energy cost savings is greater than the loss value, implementing the variation in the set of plant varietal parameters.

12. The method of claim 1, wherein the robotic transplanter is configured to transfer the respective plants to new trays with adjusted spacing for optimized density.

13. The method of claim 1, wherein the robotic transplanter is configured to mechanically transplant the respective plants into lower density trays.

14. The method of claim 1, wherein the robotic transplanter is configured to grip a substrate using robotic members.

15. The method of claim 1, wherein the robotic transplanter is configured to grip and move individual plants in pods.

16. The method of claim 1, wherein the robotic transplanter is configured to mechanically transplant the respective plants into a hydroponic plant vessel.

17. The method of claim 16, wherein the hydroponic plant vessel is part of a greenhouse hydroponic system.

* * * * *